Patented Oct. 14, 1924.

1,511,590

UNITED STATES PATENT OFFICE.

WILLIAM J. BUTTFIELD, OF NORTH PLAINFIELD, NEW JERSEY, ASSIGNOR TO VULCAN DETINNING COMPANY, OF SEWAREN, NEW JERSEY, A CORPORATION OF NEW JERSEY.

PROCESS OF RECOVERING TIN FROM TIN-BEARING MATERIALS.

No Drawing.  Application filed November 1, 1920.  Serial No. 421,121.

*To all whom it may concern:*

Be it known that I, WILLIAM J. BUTTFIELD, residing at No. 2 Rockview Heights, North Plainfield, in the county of Somerset, State of New Jersey, have invented certain new and useful Improvements in Processes of Recovering Tin from Tin-Bearing Materials; and I do hereby declare the following to be a full, clear, and exact description of the invention, such as will enable others skilled in the art to which it appertains to make and use the same.

The present invention relates to improvements in the recovery of tin from tin-bearing materials, that is to say, the removal and recovery of tin from such materials as tin-coated sheet iron or sheet steel, tin plate scrap, and other like materials having a coating of metallic tin.

The practice of the invention, in its complete embodiment, contemplates four general operations, to wit: (1) The removal of the extraneous or foreign matter from the tin coating of the material treated, that is to say, the removal of such material as dirt, grease, paint, lacquer, etc., by subjecting it, in filled baskets or the like, to the action of a hot solution of weak caustic, and by subsequent rinsing; (2) the removal of the tin coating from the material, by subjecting it to the solvent action of a hot oxidizing solution of alkali, thereby detinning the material under treatment, and obtaining a solution containing sodium stannate; (3) crystallizing out and precipitating the sodium stannate from the stripping solution referred to; and finally, (4) dissolving in hot water the sodium stannate thus obtained and electrolyzing the resulting solution, so as to obtain metallic tin.

As above indicated, the preliminary treatment of the material is for the purpose of removing the extraneous or foreign matter from the tin coating. This is preferably effected, by providing a hot solution of weak caustic, contained in a large tank, wherein the tin-coated material contained in filled baskets or the like is immersed. The dirt, grease, paint and lacquer are removed by the action of the weak caustic solution, whereupon, the baskets with their contents are transferred to a second tank containing hot water, for the purpose of rinsing off whatever residues may still remain adhering to the tin coating.

The detinning operation, per se, is effected by placing the cleaned and rinsed material (preferably while still contained in the baskets) in a hot oxidizing solution of alkali, such as, for instance, a solution of sodium hydroxide containing an oxidizing agent such as sodium nitrate. In this so-called "stripping" solution, the tin goes into solution as sodium stannate, according to the equation:

$$2Sn + 3NaOH + NaNO_3 = 2Na_2SnO_3 + NH_3.$$

The stripping solution should preferably contain from 50 to 100 grams of caustic and 10 to 50 grams of sodium nitrate per liter (5% to 10% by weight of caustic and 1% to 5% by weight of sodium nitrate), and, during the stripping of the tin from the material, the solution should be maintained at a temperature above 90° C. in order to dissolve the tin rapidly. Under these conditions, the tin-coated material may be completely detinned in from one to three hours, depending upon the thickness of the tin coating, upon the amount of free caustic and of sodium nitrate in the solution, upon the temperature of the solution and upon the thoroughness of the circulation of the solution through the mass of tin-bearing material under treatment; the larger the amount of free caustic and sodium nitrate in the solution, and the hotter the solution, the more rapidly will the detinning be accomplished.

The crystallizing and precipitating of the sodium stannate from the stripping solution employed may be accomplished in either one of three ways; thus, by adding sodium hydroxide and/or sodium nitrate to the solution, advantage may be taken of the effect incident to such addition, i. e., that of greatly decreasing the solubility of sodium stannate in an alkali solution; or, a part of the solution (almost saturated with sodium stannate) may be removed from the stripping tank, and evaporated up to the crystallization point of sodium stannate, with incidental cooling, whereby the major part of the sodium stannate will crystallize out from the solution; or the tin-content of the stripping solution may be concentrated to a point where the sodium stannate crystallizes or precipitates out. In either case, the mother liquor is then returned to the stripping tank, and again used therein for detinning, which permits the detinning of a further quantity of tin-bearing material without the addition of a new lot of caustic. The more concentrated the solution in sodium hydroxide and sodium nitrate, the smaller the amount of sodium stannate that will remain in the solution.

In the final or electrolytic phase of the treatment, the crystals and precipitate of sodium stannate are collected and dissolved in hot water, forming a solution of sodium stannate, containing say more than 50 grams of tin per liter. This sodium stannate solution is then electrolyzed, at a temperature preferably above 80° C., in suitable iron tanks, with iron anodes and with tin cathodes, or tin-coated cathodes, thus obtaining the tin, at high current-efficiency, in the form of dense deposits of the metal. The resulting caustic solution is returned to the stripping tanks in which the detinning or stripping of the tin-bearing materials is conducted. When the cathode deposits of tin have acquired the desired thickness the cathodes are removed from the electrolytic tank. If the cathodes are of tin, they are melted, or if the cathodes are of tin-coated iron, the tin deposits are stripped therefrom and melted. The electrolytic tin thus obtained may, if desired, be given a refining treatment, whereby the purest grade of tin may be produced.

Incidental to the detinning of the tin-bearing materials is the washing of the pregnant solutions therefrom, and the using of the wash waters in such manner as to avoid any substantial loss of tin. This is accomplished by placing the baskets containing the detinned materials, immediately they are removed from the stripping tanks, upon a suitable platform or the like, from which the solution drains back into the stripping tanks. After the baskets and their contents have been so drained, they are dipped successively into a series of two or more wash tanks containing hot water, in order to remove the remnants of the adhering pregnant solutions which likewise contain some sodium stannate. The wash water thus obtained is then used as a "make-up" to take the place of the water which evaporates from the stripping tanks or which is otherwise lost in the general process, by evaporation or otherwise. After the baskets of detinned materials have been allowed to drain off the adhering wash-waters, the baskets are emptied, and the detinned steel or iron is compressed into billets and subsequently smelted, as, for instance, in open hearth furnaces, blast furnaces, or cupolas.

The process of recovering tin from tin-bearing materials as set forth herein, possesses important economical advantages, in many cases, over the processes as ordinarily conducted. Thus, the detinning per se is accomplished in a relatively short period of time, the stripping solutions are partially regenerated by evaporation and by electrolysis, the electrolytic deposition of tin from the sodium stannate solution obtained is accomplished at high current-efficiency, and the tin is obtained as dense solid adherent metal of high quality.

Particularly, it has been discovered that high current-efficiency is dependent upon high tin-content in the electrolyte, and comparatively low content of sodium hydroxide and sodium nitrate. Consequently, in order to maintain a high content of tin in the electrolyte, fresh sodium stannate crystals are added continually. This is preferably accomplished by circulating the partially spent electrolyte before it is returned to the electrolyzing cells, through a tank in which sodium stannate crystals are at all times contained, which crystals are rapidly taken into solution by constant agitation.

In the process of electrolysis, the tin is deposited on the cathode or cathodes, and the sodium hydroxide content of the electrolyte is thereby automatically increased by an equivalent amount. When the sodium hydroxide content of the electrolyte reaches a point where the electrolytic efficiency is materially lowered, the addition of fresh sodium stannate crystals is discontinued and the electrolytic efficiency is restored in any one of the following ways, to wit: (1) the major part of the tin in the electrolyte is removed by electrolysis and the partially spent electrolyte is either returned to the stripping tank direct, or, if it contains an excessive amount of carbonates, is evaporated to crystallization of sodium stannate and the mother liquor re-causticized by means of lime, or otherwise, and the solution is then returned to the stripping tanks; or (2) all of the tin in the electrolyte is removed by electrolysis and the spent electrolyte is either returned to the stripping tanks direct, or, if it contains an excessive amount of carbonates is recausticized and then returned to the stripping tanks; or (3) the electrolyte is removed from the electrolytic system, evaporated to crystallization of sodium stannate and the mother liquor returned to the stripping tanks direct, or after having been recausticized, depending upon whether or not the solution contains an excessive amount of carbonates.

It has also been discovered that the current-efficiency in the electrolytic deposition of the tin from the alkaline solution is affected by the temperature of the solution, the rate of circulation of the solution between the electrodes, the kind of cathode used, and the current density. The conditions which have been found to give high current-efficiency may be illustrated by the following example: An electrolyte containing say more than 50 grams of tin per liter was prepared by dissolving sodium stannate crystals in water. The current-efficiency was low when the temperature of the electrolyte was below 80° C. The solution was thereupon heated above that temperature and was subjected to electrolysis by passing it through a series of iron tanks containing insoluble iron anodes and containing cathodes of tin-coated sheet steel or tin-coated sheet iron, spaced approximately 2" apart. The temperature of the solution was maintained above 80° C. by circulating it through a heater, which was placed in the system between the outflow and the inflow pipes of the series of electrolytic tanks. It was found that cathodes of sheet iron or cathodes of sheet steel caused a low current-efficiency, because of the low hydrogen-overvoltage of iron in alkaline solutions; but when cathodes of tin or cathodes of tin-coated sheet steel or tin-coated sheet iron were used the current-efficiency was high,—95% efficiency being maintained when such cathodes were used. Thus, by operating under these conditions as outlined, a small installation only is required to recover tin from tin-bearing materials, and to electrolytically deposit therefrom a large amount of tin with the expenditure of a comparatively small quantity of electric energy.

The main important features of the detinning process hereinbefore described, are the means employed for materially increasing the current-efficiency in the deposition of the tin from the electrolyte; and the decrease, to a minimum, in the electrolyte, of the amount of oxidizing agent (such as alkali nitrates) required for the detinning of tin-bearing materials, without increasing (and even lessening) the time of detinning.

These results are obtained, as hereinbefore noted, by chemically stripping the tin from the tin-coated materials by the use of alkali solutions, containing, at the start, a larger amount of oxidizing agent, and, when the solution becomes saturated with sodium stannate, transferring the solution to an evaporator and evaporating it therein to the point at which the major part of the sodium stannate has separated out as crystals. The crystals are then to be separated from the mother liquor, and the mother liquor returned directly to the stripping tanks; or, if the liquor contains an excessive amount of carbonates, it is first recausticized,—preferably by heating it with caustic lime. The crystals of sodium stannate are then dissolved in hot water, and the hot solution is caused to circulate through a series of electrolytic tanks and a suitable heater, as described, precipitating the tin on sheet tin cathodes or tin-coated cathodes, at high current-efficiency, as adherent deposits which are melted direct, refined, and cast into bars.

So also during the electrolytic deposition of the tin, an equivalent amount of sodium hydroxide is formed thereby regenerating the solution, so that it may be used again for stripping a fresh lot of tin-bearing materials. By preparing the electrolyte from the crystals of sodium stannate, a solution high in tin-content and low in hydroxide and nitrate is obtained, thus permitting the tin to be recovered with the expenditure of a small quantity of electric energy, and the use of a smaller amount of oxidizing agent than if the process were conducted by circulating the stripping solution directly through the electrolytic tanks and back to the stripping tanks, in which latter case, the nitrates (or other oxidizing agents) are consumed and the current-efficiency of the deposition of tin is decreased.

What I claim is:

1. In the recovery of tin from tin-bearing materials, the method of removing dirt, grease, paint, lacquer, or the like, from the tin surface without any substantial solution of tin, which comprises subjecting the material to the action of a hot solution of weak caustic.

2. In the recovery of tin from tin-bearing materials, the method of removing dirt, grease, paint, lacquer, or the like, from the tin surface without any substantial solution of tin, which comprises subjecting the material to the action of a hot solution of weak caustic, and then rinsing the material thus cleaned.

3. In the recovery of tin from tin-bearing materials, the process of detinning, which comprises removing the tin coating from the material by subjecting it to the action of a hot oxidizing solution containing 5% to 10% of caustic alkali, with the production of a final solution wherein the dissolved tin is present as a soluble stannate.

4. In the recovery of tin from tin-bearing materials, the process of detinning, which comprises removing the tin coating from the material by subjecting it to the action of a hot solution containing 5% to 10% of sodium hydroxide and containing an oxidizing agent with the production of a final solution wherein the dissolved tin is present as sodium stannate.

5. In the recovery of tin from tin-bearing materials, the process of detinning, which comprises removing the tin coating from the material by subjecting it to the action of a hot solution containing 5% to 10% of sodium hydroxide and containing sodium nitrate with the production of a final solution wherein the dissolved tin is present as sodium stannate.

6. In the recovery of tin from tin-bearing materials, crystallizing sodium stannate from the stripping solution employed, by decreasing the solubility of the sodium stannate in the solution by adding sodium nitrate thereto.

7. In the recovery of tin from tin-bearing materials, the method which comprises removing the tin from the material by subjecting it to the action of a hot stripping solution of sodium hydroxide containing sodium nitrate, thoroughly circulating the solution through the mass of tin-bearing material, crystallizing out sodium stannate from the stripping solution by removing part of the solution and evaporating it to the crystallization point of sodium stannate, and returning the mother liquor to the stripping tank for reuse.

8. In the recovery of tin from tin-bearing materials, wherein the tin is removed from the materials by a stripping solution, washing the pregnant solutions from the stripped material and using the wash-water as a "make-up" to take the place of such water as evaporates from the stripping tanks, or which is otherwise lost in the general process.

9. In the recovery of tin from tin-bearing materials, wherein the tin is obtained in the form of sodium stannate, dissolving the sodium stannate to form a solution containing over 50 grams of tin per liter, and electrolyzing the solution.

10. In the recovery of tin from tin-bearing materials, wherein the tin is obtained in the form of sodium stannate, dissolving the sodium stannate to form a solution containing over 50 grams of tin per liter, and electrolyzing the solution at a temperature of above 80° C.

11. In the recovery of tin from tin-bearing materials, wherein the tin is obtained in the form of sodium stannate, dissolving the sodium stannate to form a solution containing over 50 grams of tin per liter, and electrolyzing the solution with the employment of tin cathodes or tin-coated cathodes.

12. In the recovery of tin from tin-bearing materials, wherein the tin is preliminarily obtained in the form of sodium stannate, forming an electrolyte from the sodium stannate, and depositing the tin from said electrolyte with the employment of iron anodes.

13. In the recovery of tin from tin-bearing materials, wherein the tin is preliminarily obtained as sodium stannate, and wherein the sodium stannate is brought into solution to form an electrolyte, obtaining high current-efficiency during the electrolysis by maintaining high tin-content in the electrolyte.

14. In the recovery of tin from tin-bearing materials, wherein the tin is preliminarily obtained as sodium stannate, and wherein the sodium stannate is brought into solution to form an electrolyte, obtaining high current-efficiency during the electrolysis by maintaining high tin-content in the electrolyte, and a comparatively low content of sodium hydroxide and nitrate.

15. In the recovery of tin from tin-bearing materials, wherein the tin is preliminarily obtained as sodium stannate, and wherein the sodium stannate is brought into solution to form an electrolyte, circulating the electrolyte, between the inlet and outlet of the electrolyzing cells, through a tank in which there are at all times contained sodium stannate crystals.

16. In the recovery of tin from tin-bearing materials, wherein the tin is preliminarily obtained as sodium stannate, and wherein the sodium stannate is brought into solution to form an electrolyte, restoring the current-efficiency of the electrolyte, when it becomes materially lowered, by electrolyzing out the major part of the tin, and returning the spent electrolyte to the stripping solution tank employed for detinning the material.

17. In the recovery of tin from tin-bearing materials, wherein the tin is preliminarily obtained as sodium stannate, and wherein the sodium stannate is brought into solution to form an electrolyte, restoring the current-efficiency of the electrolyte, when it becomes materially lowered, by crystallizing out the sodium stannate contained in the electrolyte, and returning the spent electrolyte to the stripping solution tank employed for detinning the material.

18. In the recovery of tin from tin-bearing materials, wherein the tin is obtained in the form of sodium stannate, dissolving the sodium stannate to form a solution containing over 70 grams of tin per liter, and electrolyzing the solution with the employment of iron anodes.

19. In the recovery of tin from tin-bearing materials, wherein the tin is obtained in the form of a sodium stannate, dissolving the sodium stannate to form a solution containing over 50 grams of tin per liter, and electrolyzing the solution at a temperature of above 80° C. with the employment of iron anodes.

20. In the recovery of tin from tin-bearing materials, wherein the tin is obtained in the form of sodium stannate, dissolving the sodium stannate to form a solution containing over 50 grams of tin per liter, and electrolyzing the solution with the employment of tin cathodes or tin coated cathodes and iron anodes.

21. In the recovery of tin from tin-bearing materials, wherein the tin is preliminarily obtained as sodium stannate, and wherein the sodium stannate is brought into solution to form an electrolyte, restoring the current efficiency of the electrolyte, when it becomes materially lowered, by electrolyzing out the major part of the tin, recausticizing the spent electrolyte when it contains an excessive amount of carbonates, and returning the spent electrolyte to the stripping solution tank employed for detinning the material.

22. In the recovery of tin from tin-bearing materials, wherein the tin is preliminarily obtained as sodium stannate, and wherein the sodium stannate is brought into solution to form an electrolyte, restoring the current efficiency of the electrolyte, when it becomes materially lowered, by electrolyzing out the major part of the tin, recausticizing the spent electrolyte when it contains an excessive amount of carbonates by heating the spent electrolyte with caustic lime, and returning the spent electrolyte to the stripping solution tank employed for detinning the material.

23. In the recovery of tin from tin-bearing materials, wherein the tin is preliminarily obtained as sodium stannate, and wherein the sodium stannate is brought into solution to form an electrolyte, restoring the current efficiency of the electrolyte, when it becomes materially lowered, by removing the major part of the sodium stannate contained in the electrolyte, recausticizing the spent electrolyte when it contains an excessive amount of carbonates by heating the spent electrolyte with caustic lime, and returning the spent electrolyte to the stripping solution tank employed for detinning the material.

24. In the recovery of tin from tin-bearing materials, wherein the tin is preliminarily obtained as sodium stannate, and wherein the sodium stannate is brought into solution to form an electrolyte, restoring the current efficiency of the electrolyte, when it becomes materially lowered, by removing the major part of the sodium stannate contained in the electrolyte, recausticizing the spent electrolyte when it contains an excessive amount of carbonates, and returning the spent electrolyte to the stripping solution tank employed for detinning the material.

WILLIAM J. BUTTFIELD.

Witnesses:
G. N. KNIGHT,
CHARLES E. OUTRAM.